United States Patent [19]

Imamura et al.

[11] Patent Number: 5,452,766

[45] Date of Patent: Sep. 26, 1995

[54] HYDRAULIC CONTROL SYSTEM FOR A TRACTOR

[75] Inventors: Takeshi Imamura; Satoshi Iida; Seiichi Takahashi, all of Sakai, Japan

[73] Assignee: Kubota Corporation, Osaka, Japan

[21] Appl. No.: 138,672

[22] Filed: Oct. 18, 1993

[30] Foreign Application Priority Data

Dec. 25, 1992 [JP] Japan ................................ 4-347075
Dec. 25, 1992 [JP] Japan ................................ 4-347076
Dec. 25, 1992 [JP] Japan ................................ 4-347077

[51] Int. Cl.⁶ ............................................. A01B 63/112
[52] U.S. Cl. ................... 172/7; 73/862.57; 73/862.627; 73/862.634; 73/862.639
[58] Field of Search ............................. 172/7; 280/446.1, 280/449; 73/862.541, 862.57, 862.622, 862.634, 775, 856, 862.639, 862.621, 862.637, 862.629, 862.627, 862.625, 862.631

[56] References Cited

U.S. PATENT DOCUMENTS

| | | |
|---|---|---|
| 3,869,001 | 3/1975 | Mueller, Jr. . |
| 3,915,325 | 12/1968 | Bennett ............................ 172/7 |
| 4,280,363 | 7/1981 | Johansson ..................... 73/862.629 |
| 4,456,074 | 6/1984 | Prudenziati ........................ 172/7 |
| 4,612,995 | 9/1986 | Benedek et al. ................... 172/7 |
| 4,640,368 | 2/1987 | Kittle et al. . |
| 4,858,475 | 8/1989 | Jacobsen et al. ............... 73/862.57 |
| 5,036,714 | 8/1991 | Christoffers et al. ........... 73/862.57 |
| 5,060,965 | 10/1991 | Haefner et al. ................ 73/862.57 |
| 5,149,121 | 9/1992 | Häfner ......................... 73/862.621 |
| 5,178,220 | 1/1993 | Cevolini et al. ................... 172/7 |

FOREIGN PATENT DOCUMENTS

| | | |
|---|---|---|
| 0150224 | 8/1985 | European Pat. Off. . |
| 3433739 | 3/1986 | Germany ............................ 172/7 |
| 3700835 | 7/1988 | Germany ............................ 172/7 |
| 59-3691 | 2/1984 | Japan . |
| 59-5283 | 2/1984 | Japan . |
| 60-98905 | 6/1985 | Japan . |
| 61-33522 | 8/1986 | Japan . |
| 2133557 | 7/1984 | United Kingdom ................. 172/7 |

OTHER PUBLICATIONS

Power Farming, vol. 66, No. 2, Feb. 1987, Sutton, GB p. 33, "MB-trac pre-set draught control option".

Motorisation & Technique Agricole, No. 93, Sep. 1986, Paris, Fr, pp. 77-83 "Nouvelles applications electroniques sur Fendt".

Primary Examiner—Randolph A. Reese
Assistant Examiner—Spencer Warnick
Attorney, Agent, or Firm—Jordan and Hamburg

[57] ABSTRACT

A control system for controlling a hydraulically operable link mechanism mounted on a working vehicle. The link mechanism includes lift arms, a hydraulic actuator for controlling the lift arms, a first and a second lower links each connected at one end thereof to a working implement, and connecting rods interconnecting the lift arms and the first and second lower links, respectively. The control system includes a first coupling for pivotally connecting the first lower link to one side of a vehicle body, a second coupling for pivotally connecting the second lower link to the other side of the vehicle body, strain gauges provided for the first and second couplings, respectively, and a control device for controlling the actuator based on detection signals received from the strain gauges.

8 Claims, 11 Drawing Sheets

HYDRAULIC CONTROL SYSTEM FOR A TRACTOR

BACKGROUND OF THE INVENTION

FIELD OF THE INVENTION

The present invention relates to a hydraulic control system for a tractor.

DESCRIPTION OF THE RELATED ART

A prior hydraulic control system for a tractor is disclosed in Japanese Patent Publication No. 3-65121, for example. The control system detects a workload as one of its functions, which may be done in a top link sensing mode or a lower link sensing mode. The top link sensing mode is based on a load spring included in a top link mount, but is incapable of accurate detection of light loads. Thus the lower link sensing mode is employed, which is illustrated in FIGS. 10A, 10B and 11.

In FIGS. 10A and 10B, a tractor body includes a hydraulic device mounted in an upper rearward position thereof and having a pair of fight and left lift arms, with a control valve operable to raise and lower the lift arms. An elastically deformable cross rod extends through, and is supported through a pair of ball bearings by, fight and left side walls of the tractor body. Right and left lower links are connected to projecting portions of the cross rod through ball joints, respectively.

A top link is pivotally connected through a pin to a top link mount on the tractor body. The lift arms are connected to the fight and left lower links through lift rods, respectively. The top link and lower links constitute a connecting link device for connecting a working implement such as a plow, not shown, to the tractor body. During an earthmoving operation with the working implement, a workload F1 acts on each of the opposite ends of the cross rod, and causes an elastic deformation in a middle position thereof. A feedback device transmits an extent of the elastic deformation in the middle position of the cross rod to a control valve, as indicated by arrows in FIG. 10A, for effecting a draft control or the like.

In the prior construction shown in FIG. 11, a strain gauge detects bending, due to an elastic bending force, of a cross rod to which lower links are connected. A resulting signal is fed back to a control valve in an electric (or electronic) mode.

In the prior construction shown in FIGS. 10A and 10B, the deformation of the cross rod is amplified by the link mechanism for transmission to the control valve to cause switching of the latter. However, being a mechanical structure, the link mechanism inevitably involves backlash, play and the like, which result in low responsivity due to hysteresis errors and the like.

The prior construction shown in FIG. 11 is free from the above drawback relating to the link mechanism. A workload is detected by the strain gauge disposed in a longitudinally middle position of the cross rod supported through a pair of right and left ball bearings. Consequently, it is difficult for the cross rod to return from a bent condition to a linear form after the load is removed by hydraulic control (draft control).

In particular, the bearings supporting the cross rod are disposed in regions close to the ground. These regions, therefore, have great chances of soil and mud adhering and hardening and rubble being lodged therein. These foreign matters prevent the cross rod from completely returning to the original shape after removal of the workload.

SUMMARY OF THE INVENTION

The object of the present invention is to provide a control system for a tractor having a construction to produce no mechanical loss or hysteresis loss when feeding back a detection value of a workload occurring during an operation of the tractor, and capable of accurate detection and control of the workload when the latter is diminished or removed.

The above object is fulfilled, according to the present invention, by a hydraulic control system for a tractor having a hydraulic device with lift arms and a connecting link mechanism attached to a tractor body, the lift arms being connected to a first and a second lower links of the link mechanism such that the lower links are vertically movable through a control valve and the hydraulic device based on detection of a workload, in which the control system includes a first and a second mounting pins for connecting the first and second lower links to fight and left sides of the tractor body, strain gauges provided for the first and second mounting pins for detecting workloads applied thereto as shear strains, respectively, and a feedback device for transmitting detection signals from the strain gauges to the control valve.

The tractor having the above construction may engage in a plowing operation with a working implement connected thereto. When the workloads are greater than a predetermined reference value, the system decides that an excessive tractive force is applied, and carries out what is known as a draft control, i.e. causes the hydraulic device to raise the working implement.

Specifically, when a workload F is applied to each of the first and second lower links as shown in FIG. 1, the mounting pin is subjected to a shear strain which is detected by the strain gauge. The resulting signal is fed back to the control valve to raise the working implement, thereby to diminish the tractive force. The first and second mounting pins are arranged on the fight and left sides of the tractor body, and the shear strains of the pins are detected reliably by the strain gauges. Each mounting pin has a small axial length to return to an original shape completely after removal of the load.

Other features and advantages of the present invention will be apparent from the description of preferred embodiments of the invention, as illustrated in the accompanying drawings.

DETAILED DESCRIPTION OF THE PREFERRED EMBODIMENTS

First Embodiment

Figure 1:
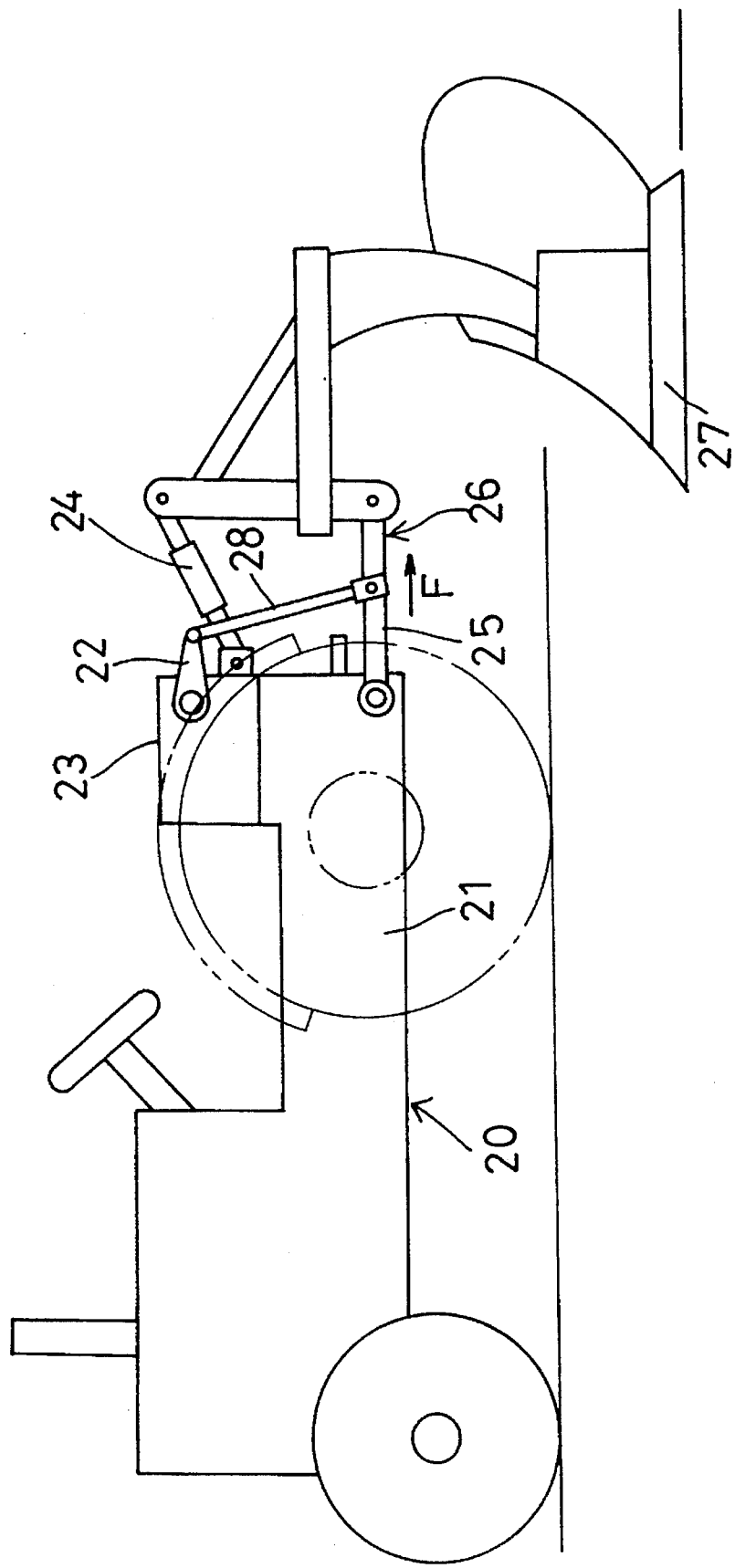
FIG. 1 is a side elevation of a tractor with a plow connected thereto.

An embodiment of the present invention will be described hereinafter with reference to the drawings. FIG. 1 shows a tractor having a plow connected thereto as an example of working implements. This tractor is a 2-axle 4-wheel tractor 20 having a tractor body 21 with a hydraulic device 23 mounted on an upper rearward portion thereof and including a pair of right and left lift arms 22. The tractor body 21 further includes a three-point link device 26 attached to the rear end thereof. This link device 26 includes a middle top link 24 and a pair of first and second or right and left lower links 25. A plow 27 is connected to the tractor body 21 through the link device 26. The fight and left lift arms 22 are connected to the first and second lower links 25 through lift rods 28 to vertically move the plow 27.

Figure 2:
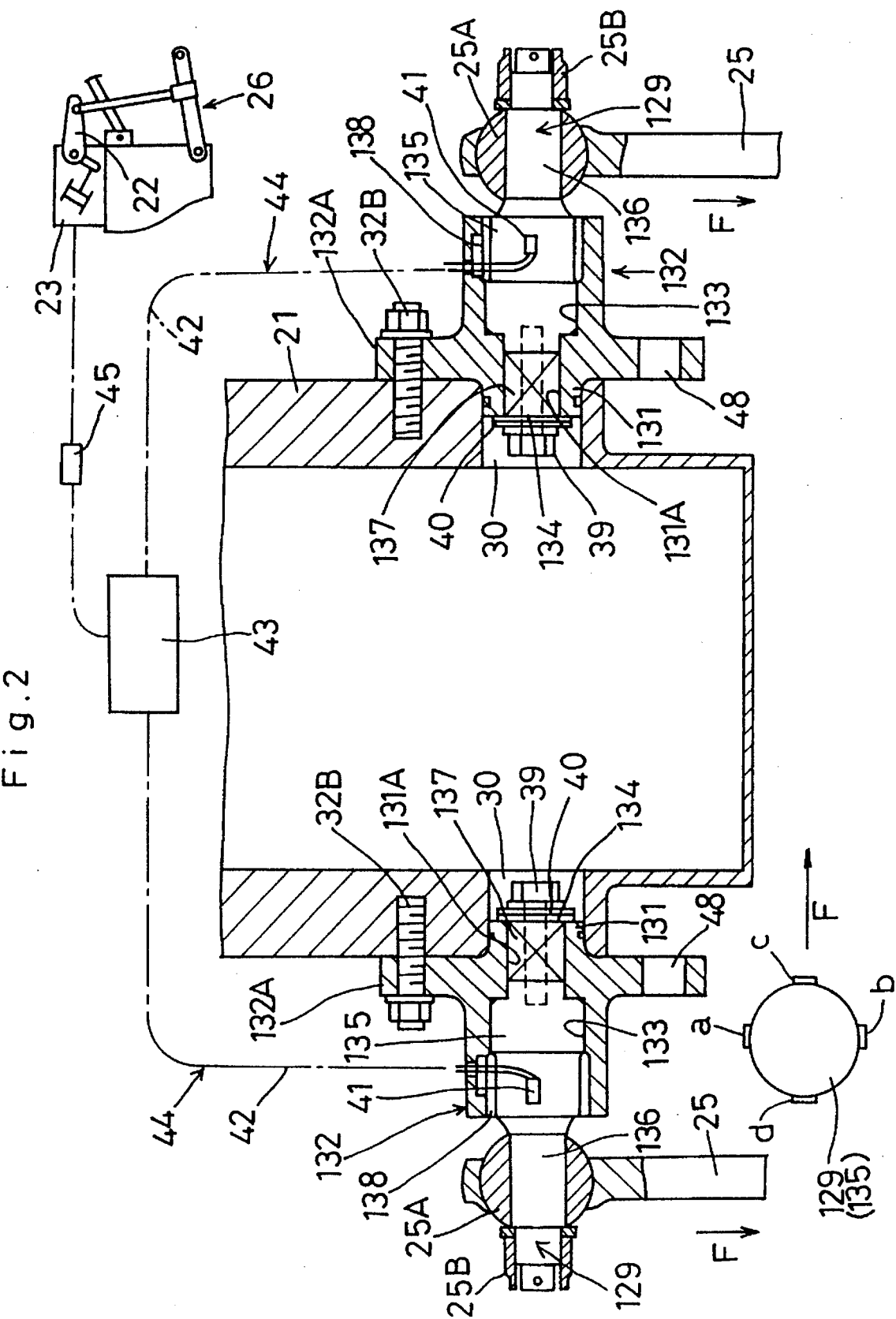
FIG. 2 is an overall view of a first embodiment of the present invention.

FIG. 2 shows a hydraulic control system for effecting a draft control operation and the like. In the first embodiment shown in FIG. 2, the tractor body 21 includes a first and a second lower link mounting pins 129 formed short and projecting outward from fight and left side walls thereof. One end of each lower link 25 is connected to the corresponding one of the first and second pins 129 through a ball joint 25A and retained in place by a nut 25B or the like.

Specifically, an engaging bore or recess 30 is formed in each of opposite lower side positions of the tractor body 21, and a holder 132 having a spigot-like insert portion 131 is fitted in the engaging bore 30. The holder 132 defines a flange 132A bolted as at 32B to the side wall of the tractor body 21. The insert portion 131 includes a first, small diameter pin receiving bore 131A formed axially thereof, and a second, large diameter pin receiving bore 133 continuous with the first bore 131A through a stepped portion.

The mounting pin 129 includes a small diameter pin portion 134, a large diameter intermediate pin portion 135 and a small diameter pin portion 136 arranged in the stated order to form a shank of the mounting pin 129. The small diameter pin portion 134 is fitted in the first pin receiving bore 131A, and prohibited from rotating relative to the holder 132 by planar surfaces (non-circular section) 137. The intermediate pin portion 135 is fitted in the second pin receiving bore 133 with a radial space 138 defined therebetween.

The small diameter pin portion 134 includes a female screw formed axially therein and meshed with a bolt 39, the latter pressing a retainer collar 40 against an end surface of the insert portion 131, to retain the mounting pin 129 in the holder 132. The flange 132A of the holder 132 to which the mounting pin 129 is assembled is bolted as at 32B to the tractor body 21.

The mounting pin 129 is elastically deformable within a radial range provided by the space 138. This space 138 is used to attach a strain gauge 41 peripherally of the intermediate pin portion 135 for detecting a shear strain. A detection signal provided by the strain gauge 41 is transmitted through a lead 42 to an electronic (or electric) control circuit 43 by a feedback device 44. This circuit 43 combines the detection signals from the right and left strain gauges 41 to control an electromagnetic control valve 45 of the hydraulic device 23.

Figure 3:
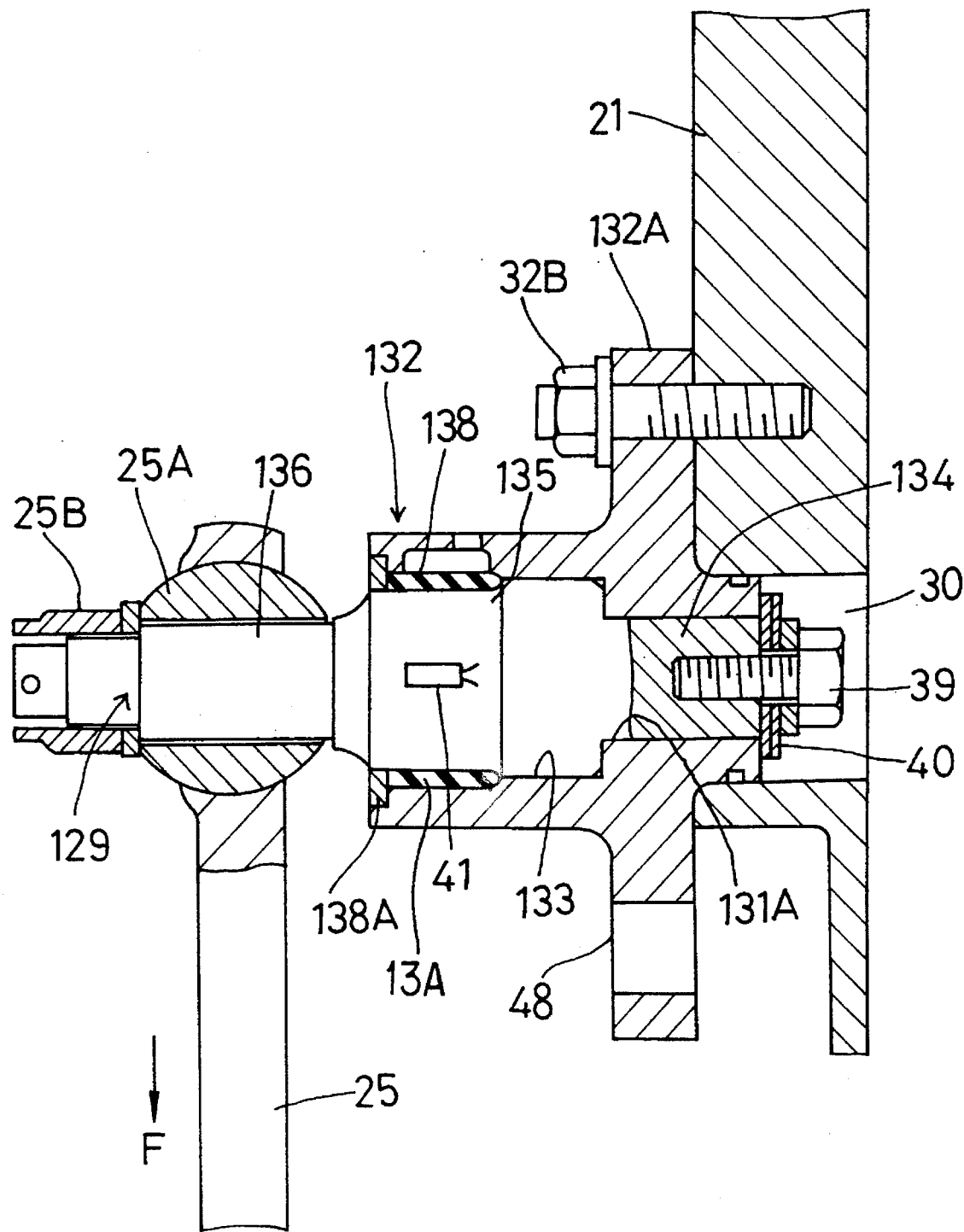
FIG. 3 is a sectional view of a principal portion showing a restrictor mounted on a connecting pin.

As shown in FIG. 3, an elastic rubber ring or the like may be fitted in the space 138 to contact an entire circumference of the mounting pin 129. This rubber ring or the like acts as a displacement restrictor 13A, a fragment of which is shown in FIG. 3, to prevent an excessive displacement of the mounting pin 129.

With the above construction, each strain gauge 41 detects a workload F during an earth-moving operation, the resulting strain being converted into an electric resistance or the like for controlling the control valve 45. The strain gauge 41 may include gauge elements "a" and "b" mounted in upper and lower positions of the intermediate pin portion 135 to directly detect a shear strain, and/or gauge elements "c" and "d" mounted in front and rear positions of the intermediate pin portion 135 to detect a bending strain through compression or tension.

Second Embodiment

Figure 4:
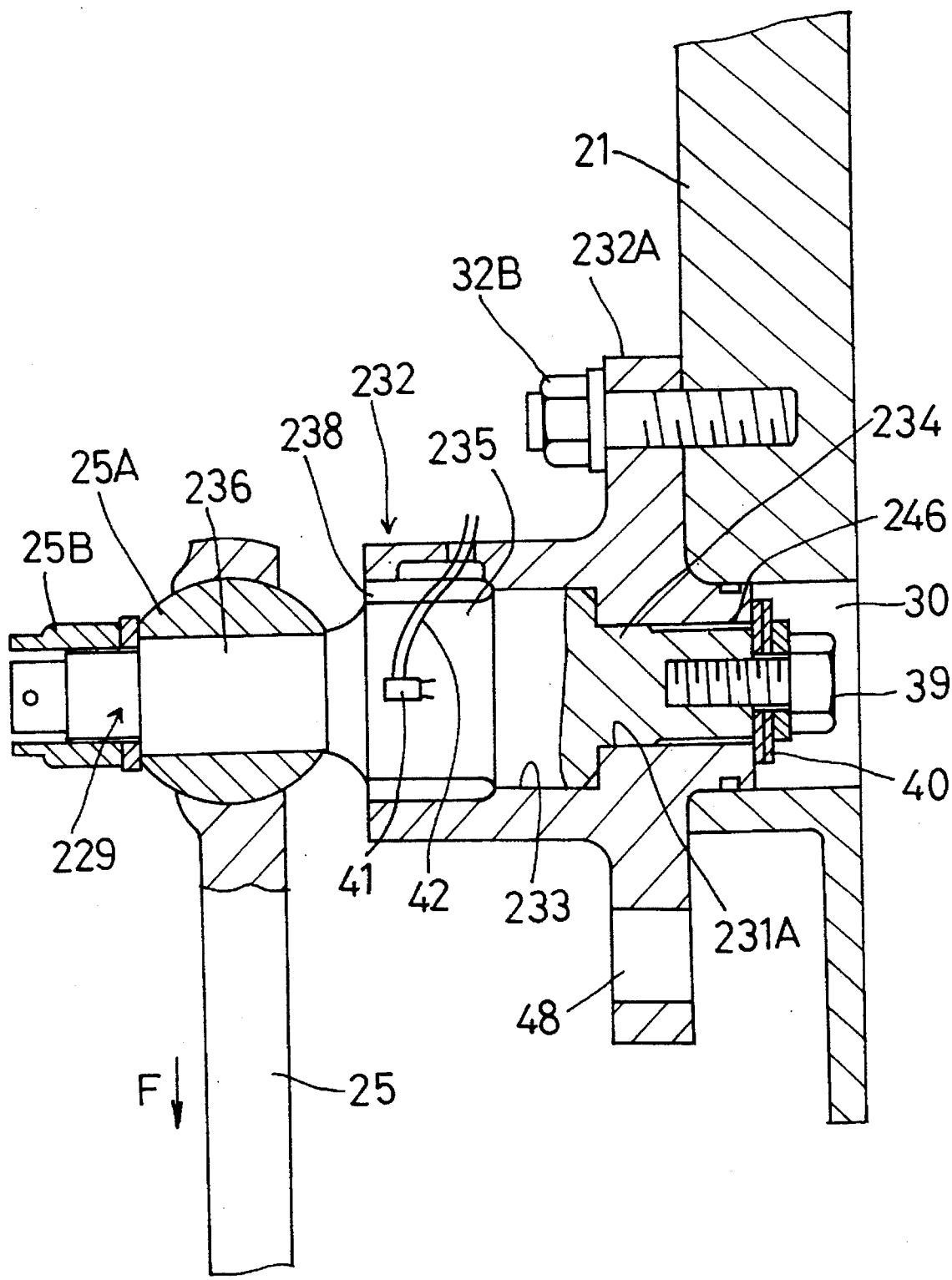
FIG. 4 is a sectional view of a principal portion of a second embodiment.

FIG. 4 shows a second embodiment of the present invention, which employs involute splines 246 for positioning a small diameter pin portion 234 in a first pin receiving bore 231A.

The involute splines 246 prohibit a relative rotation between a mounting pin 229 and holder 232. Compared with the planar surfaces 137 in the first embodiment, this construction has advantages of enabling broaching for mass production, attaining high precision, diminishing wear due to a concentration of surface pressure, and eliminating chattering. The other aspects are the same as in the first embodiment, and in FIG. 4 like reference numerals are used to identify like parts in the first embodiment.

Third Embodiment

Figure 5:
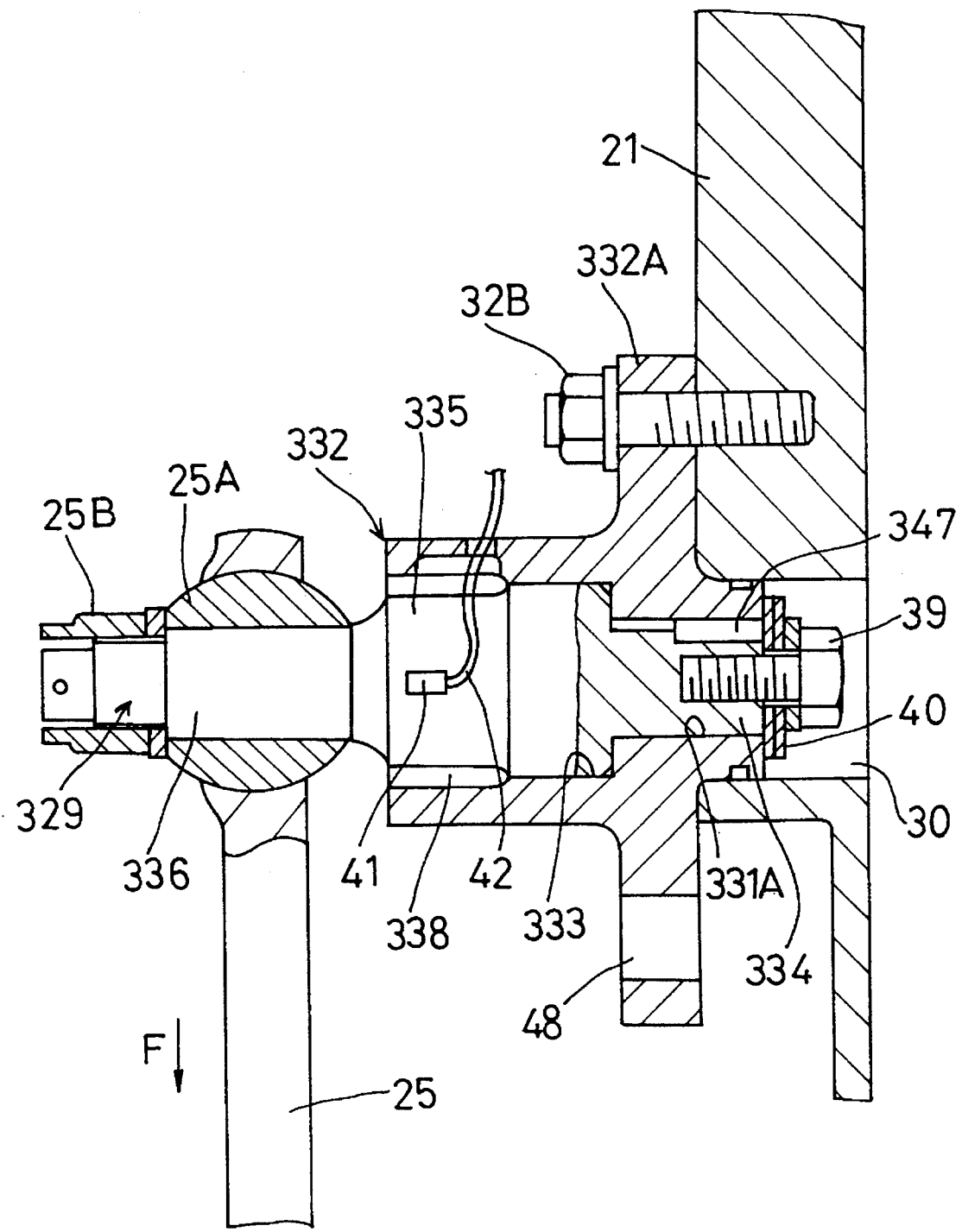
FIG. 5 is a sectional view of a principal portion of a third embodiment.

FIG. 5 shows a third embodiment in which a mounting pin is denoted by numeral 329. The mounting pin 329 is prevented from rotating relative to a holder 332 by a rotation stopper 347 in the form of a key and groove instead of the planar surfaces 137 and involute splines 246 in the preceding embodiments. This rotation stopper 347, despite its small dimensions, can eliminate radial chattering and support a load over a long span, to realize improved durability. The other aspects are the same as in the first embodiment, and in FIG. 5 like reference numerals are used to identify like parts in the first embodiment.

Fourth Embodiment

Figure 6:
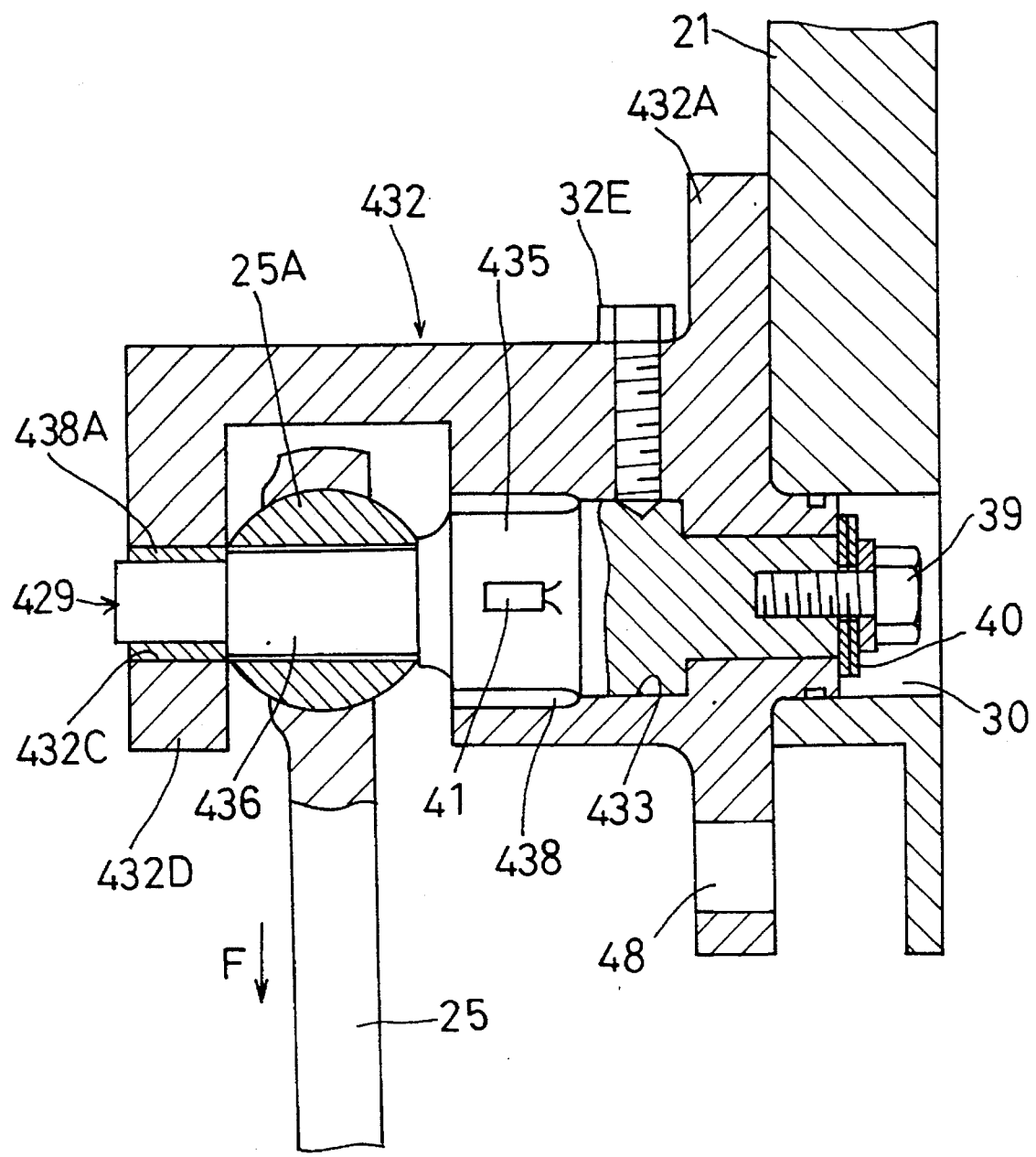
FIG. 6 is a sectional view of a principal portion of a fourth embodiment.

FIG. 6 shows a fourth embodiment in which a holder 432 includes an arm 432D defining a supporting bore 432C. Thus, a mounting pin 429 is supported at opposite ends thereof.

The mounting pin 429 is held against rotation by a bolt 32E screwed to the holder 432 from behind. The arm 432D is welded to the holder 432 after the mounting pin 429 is assembled to the main body of the holder 432. The other aspects are the same as in the first embodiment, and in FIG. 6 like reference numerals are used to identify like parts in the first embodiment.

Fifth Embodiment

Figure 7:
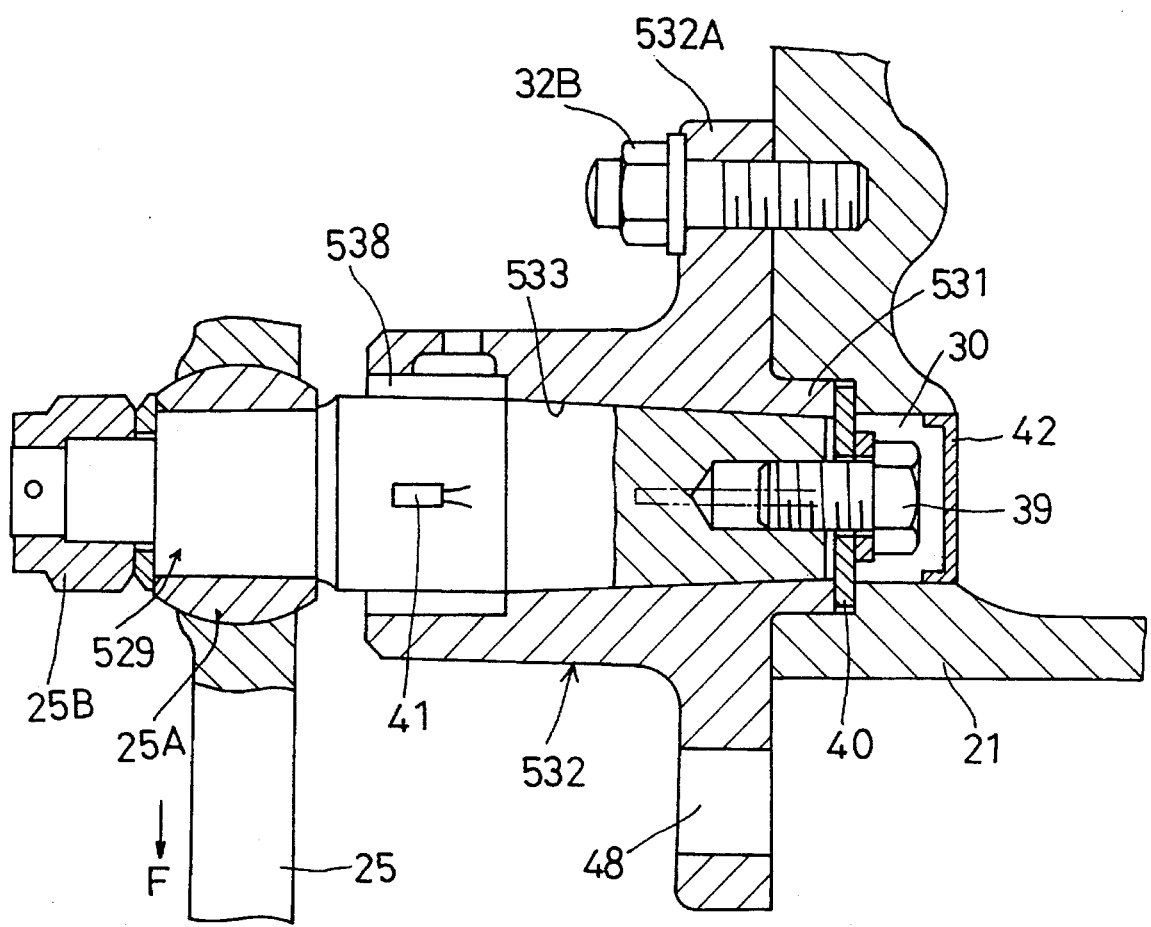
FIG. 7 is a sectional view of a principal portion of a fifth embodiment.

FIG. 7 shows a fifth embodiment in which a holder 532 includes an insert portion 531 defining a pin receiving bore 533 tapered axially inwardly. A mounting pin 529 is fitted in the pin receiving bore 533 and retained in place by a bolt 39 and collar 40. With the mounting pin 529 mounted through the taper fitting structure as above, the insert portion 531 may be formed long to provide a reduced surface pressure, thereby to check chattering due to fatigue. The bolt 39 is tightened to produce an initial compressive stress in the taper fitting structure for checking chattering under a load. The other aspects are the same as in the first embodiment, and in FIG. 7 like reference numerals are used to identify like parts in the first embodiment.

Sixth Embodiment

Figure 8:
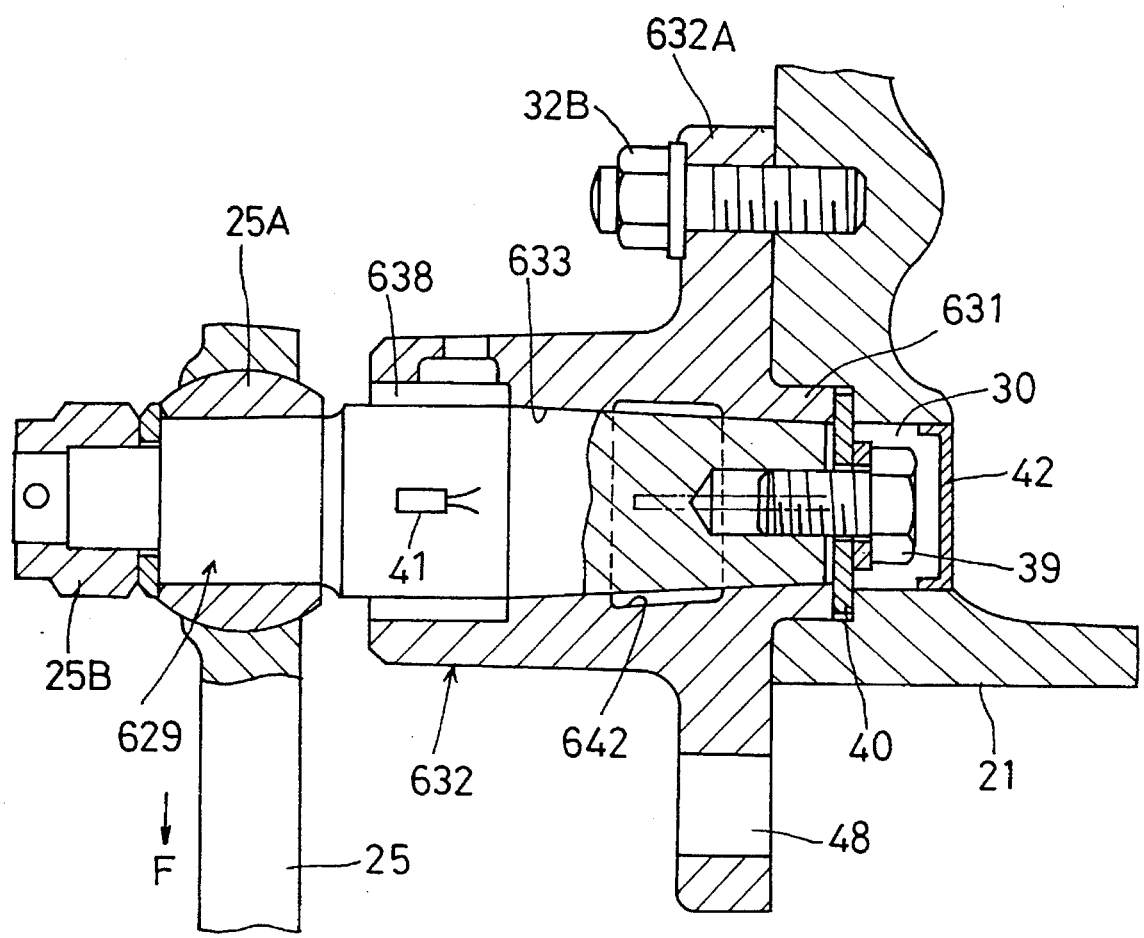
FIG. 8 is a sectional view of a principal portion of a sixth embodiment.

FIG. 8 shows a sixth embodiment which has substantially the same mounting pin 629 as in the fifth embodiment. A holder 632 in this embodiment includes a tapered pin receiving bore 633 defining a peripheral groove 642 in an intermediate position thereof. This structure has an improved taper engagement over the fifth embodiment. That is, the peripheral groove 642 divides a contact area of the taper engagement into a large diameter part (outward part) and a small diameter part (inward part) to extend a supporting span.

In the six embodiments described above, the holders are formed of an elastic metal, each defining a draw bar box connecting bore 48, since the tractor body 21 usually is formed of casting. Where a rotary implement is connected to the tractor, a workload is applied in the opposite direction to the workload F in the drawings.

The other aspects of the sixth embodiment are the same as in the first embodiment, and in FIG. 8 like reference numerals are used to identify like parts in the first embodiment.

Seventh Embodiment

Figure 9:
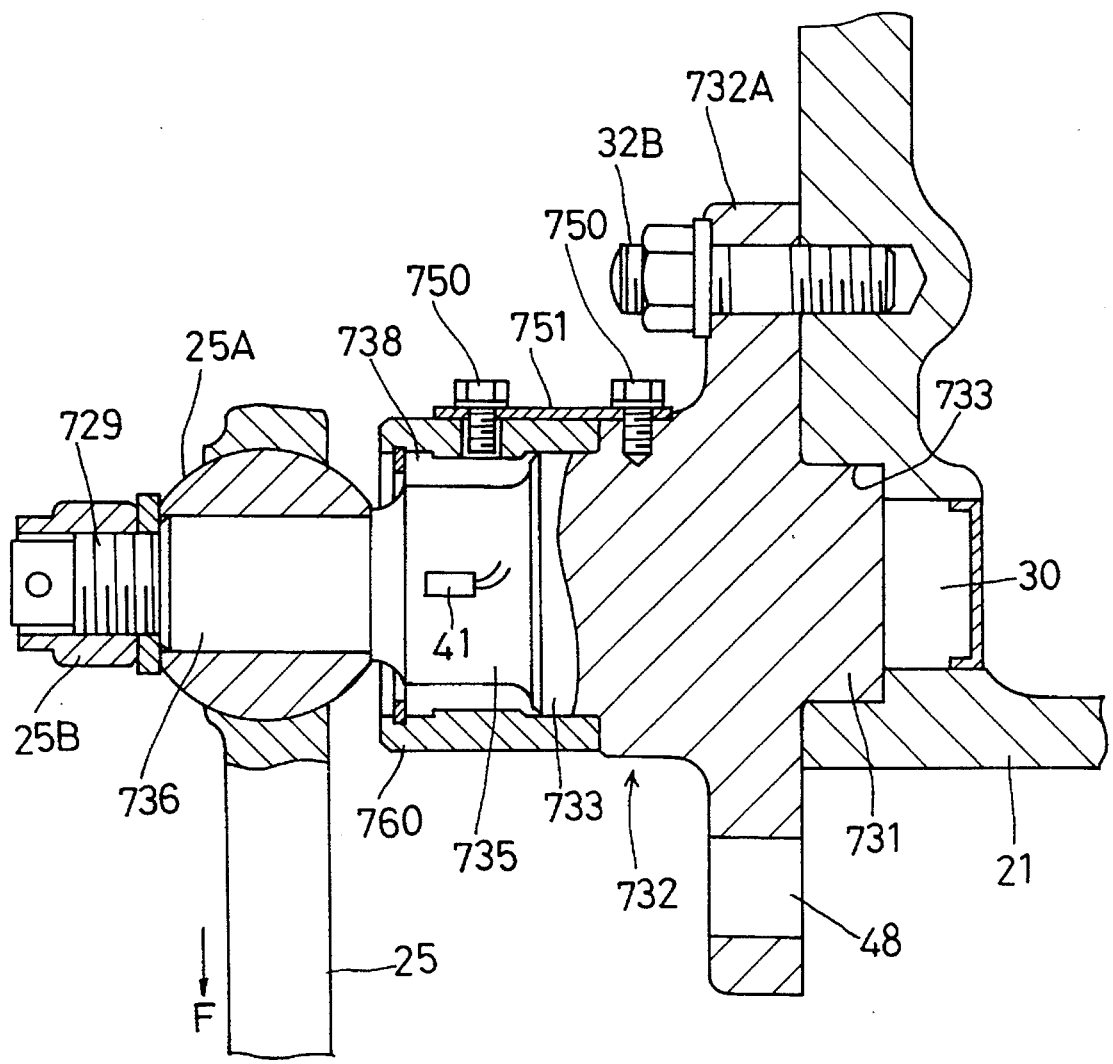
FIG. 9 is a sectional view of a principal portion of a seventh embodiment.
Figure 10A:
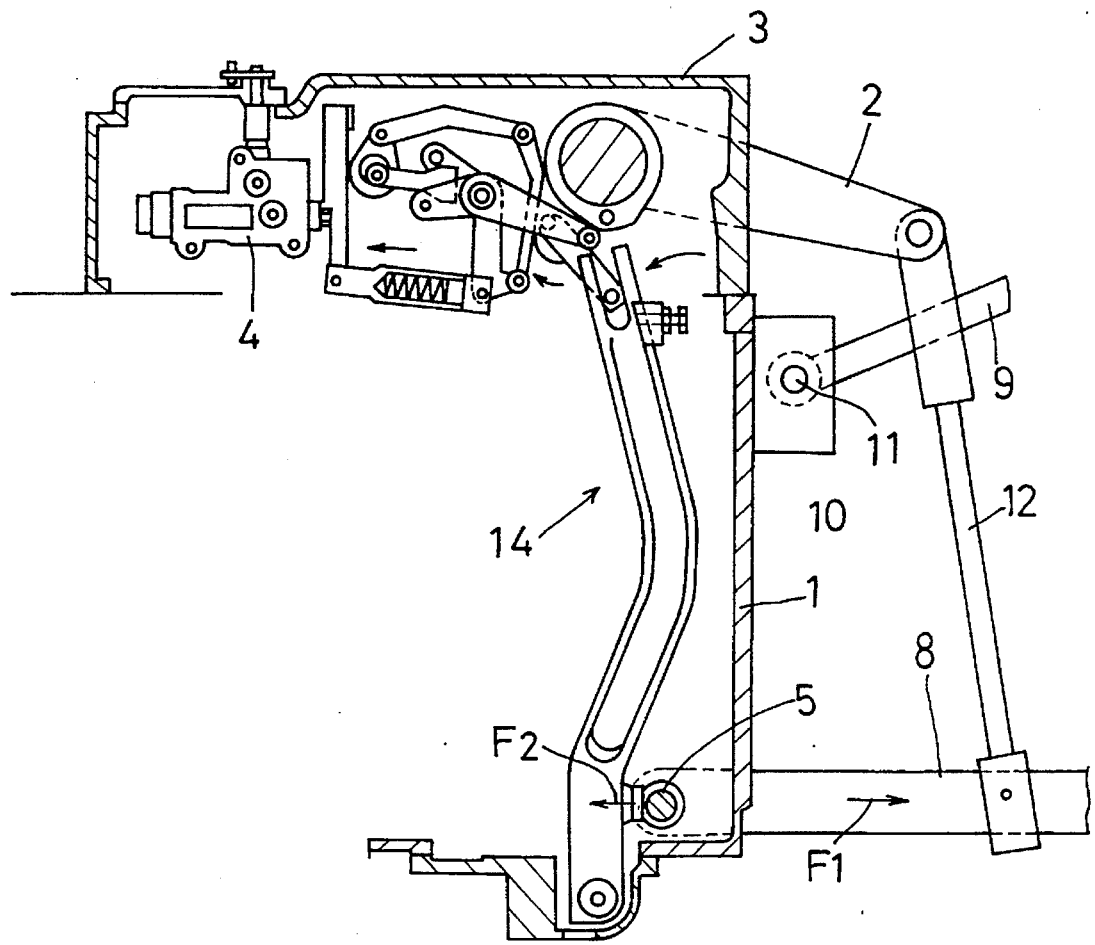
FIG. 10A is a fragmentary view in vertical section of a prior workload detecting device.
Figure 10B:
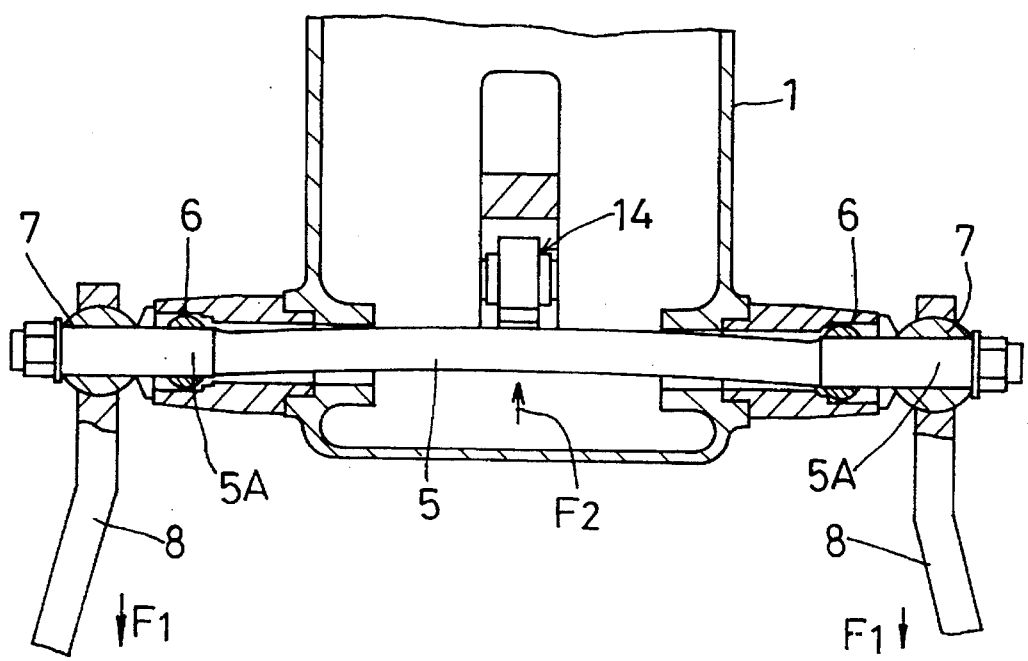
FIG. 10B is a sectional plan view of the prior workload detecting device shown in FIG. 10A.
Figure 11:
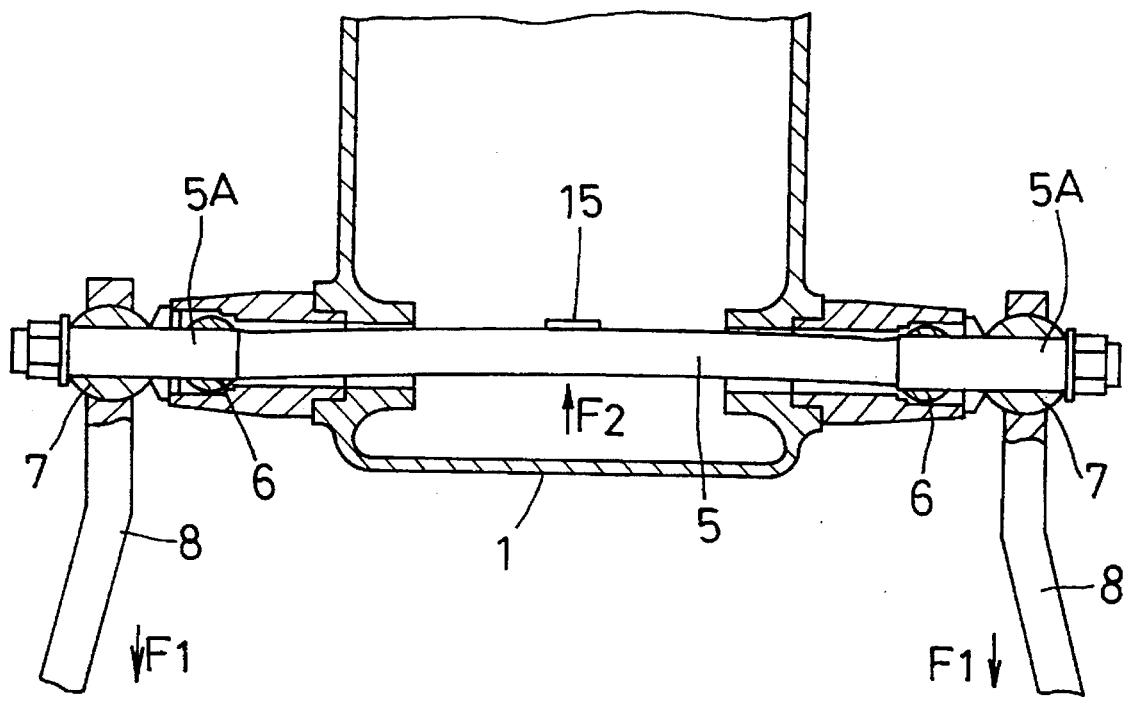
FIG. 11 is a sectional plan view of another prior workload detecting device.

FIG. 9 shows a seventh embodiment which has a characterizing feature in that the lower link mounting pin and holder formed separately in the preceding embodiments are now integrated into a lower link coupling 732. This structure can dispense with the rotation stopper (such as splines, key groove, non-circular sectional shape or the like) for prohibiting relative rotation between the mounting pin and holder.

Specifically, as shown in FIG. 9, the lower link coupling 732 includes a spigot-like insert portion 731, at a fighthand end in the drawing, fitted in an engaging bore or recess 733 formed in a lower side position of the tractor body 21. The lower link coupling 732 defines a flange 732A bolted as at 32B to the tractor body 21. The lower link coupling 732 further includes, extending outwardly of the flange 732A, a first cylindrical portion 733 having a large diameter, a second cylindrical portion 735 of smaller diameter than the first cylindrical portion 733, a third cylindrical portion 736 of smaller diameter than the second cylindrical portion 735, and a peripherally threaded distal end 729.

One of the lower links 25 is connected to the third cylindrical portion 736 through a ball joint 25A, and retained in place by a nut 25B screwed to the distal end 729. A strain gauge 41 is attached peripherally of the second cylindrical portion 735 to detect a shear strain due to a workload transmitted from the working implement 27 as a shear strain. A hollow tubular cover 760 is mounted peripherally of the first cylindrical portion 733, and is fixed thereto through a mounting plate 75 1 and bolts 750. This cover 760 protects the strain gauge 41 from soil, dust and the like during a plowing operation with the working implement. Where a more reliable protection of the strain gauge 41 is desired with regard to entry of soil, dust and the like, a dust seal may be fitted in a lefthand end (in FIG. 9) of the cover 760. The other aspects are the same as in the first embodiment, and in FIG. 9 like reference numerals are used to identify like parts in the first embodiment.

What is claimed is:

1. A control system for controlling a hydraulically operable link mechanism mounted on a working vehicle, the link mechanism having lift arms, a hydraulic actuator for controlling the lift arms, a first and a second lower links each connected at one end thereof to a working implement, and connecting rods interconnecting the lift arms and the first and second lower links, respectively, said control system comprising:

first and second coupling means for respectively pivotably connecting the first and second lower links respectively to one and a second of two opposite sides of the vehicle body, said coupling means each including a holder and a pin fixed to the holder, a lower link associated with a coupling means being pivotably mounted on the pin through a ball joint, the ball joint being in direct contact with the pin, the holder being fixed to the vehicle body, separate strain gauges associated with each said coupling means, a strain gauge being mounted on an associated pin at a location intermediate that at which the ball joint is in contact with the pin, and that at which the pin is fixed to the holder; and control means for controlling said actuator based on detection signals received from said strain gauges.

2. A control system as defined in claim 1, wherein said pin and said holder are formed integral with each other.

3. A control system as defined in claim 1 wherein each pin has a distal end supported by an arm of its associated holder.

4. A control system as defined in claim 3, wherein said arm is an extension of the associated holder.

5. A control system as defined in claim 1, wherein each of said coupling means further includes a displacement limiter for limiting an amount of displacement of said pin.

6. A control system as defined in claim 1, wherein said pin is attached to said holder through rotation stopper means for prohibiting rotation of said pin relative to said holder.

7. A control system as defined in claim 6, wherein said rotation stopper means includes spline structure located where an end region of said pin is fixed to the holder.

8. A control system as defined in claim 6, wherein said rotation stopper means includes an end of said pin having a non-circular section, said end of the pin being received in a non-circular section bore formed in its associated holder.

* * * * *